US012710667B2

(12) United States Patent
Heslouis et al.

(10) Patent No.: US 12,710,667 B2
(45) Date of Patent: Aug. 18, 2026

(54) COMPUTER-IMPLEMENTED METHOD FOR PROVIDING A FINISHED SINGLE VISION OPHTHALMIC LENS

(71) Applicant: ESSILOR INTERNATIONAL, Charenton-le-Pont (FR)

(72) Inventors: Mélanie Heslouis, Charenton-le-Pont (FR); Carlos Rego, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 391 days.

(21) Appl. No.: 18/019,335

(22) PCT Filed: Sep. 30, 2021

(86) PCT No.: PCT/EP2021/077020

§ 371 (c)(1),
(2) Date: Feb. 2, 2023

(87) PCT Pub. No.: WO2022/078773

PCT Pub. Date: Apr. 21, 2022

(65) Prior Publication Data

US 2023/0305316 A1 Sep. 28, 2023

(30) Foreign Application Priority Data

Oct. 14, 2020 (EP) .................................... 20306207

(51) Int. Cl.
*G02C 7/02* (2006.01)

(52) U.S. Cl.
CPC ............. *G02C 7/027* (2013.01); *G02C 7/028* (2013.01); *G02C 2202/08* (2013.01); *G02C 2202/22* (2013.01)

(58) Field of Classification Search
CPC ........ G02C 7/027; G02C 7/028; G02C 7/024; G02C 7/022; G02C 7/025; G02C 7/06;
(Continued)

(56) References Cited

U.S. PATENT DOCUMENTS 6,305,800 B1 10/2001 Miller et al.
2007/0132945 A1 * 6/2007 Haser ..................... G02C 7/061 351/159.73
(Continued)

FOREIGN PATENT DOCUMENTS

CN 101029978 A 9/2007
CN 102439511 A 5/2012
(Continued)

OTHER PUBLICATIONS

EP3663838 and translation (Year: 2020).*
(Continued)

*Primary Examiner* — Travis S Fissel
(74) *Attorney, Agent, or Firm* — NIXON & VANDERHYE

(57) ABSTRACT

This computer-implemented method for providing a finished single vision ophthalmic lens intended for a wearer, from a target lens having at least one complex surface, the finished lens having a rotationally symmetrical front surface, includes: providing wearer data or theoretical data; defining targeted optical or geometrical characteristics along a predetermined path on the target lens, based on the wearer data or on the theoretical data; determining the finished lens by: selecting an initial lens complying with the prescription data and having a rotationally symmetrical front surface and a predetermined curvature at a prescription reference point; defining a current lens as the initial lens; modifying a front surface definition of the current lens to reach the targeted
(Continued)

optical or geometrical characteristics until an ending criterion is met; providing the finished lens as the current lens.

20 Claims, 6 Drawing Sheets

(58) Field of Classification Search
CPC ........ G02C 7/061; G02C 7/065; G02C 7/068; G02C 7/066; G02C 2202/08; G02C 2202/22
USPC ...................................................... 351/159.74
See application file for complete search history.

(56) References Cited

U.S. PATENT DOCUMENTS

| | | | | |
|---|---|---|---|---|
| 2007/0242220 | A1 | 10/2007 | Guilloux et al. | |
| 2010/0149492 | A1 | 6/2010 | Allione et al. | |
| 2011/0273664 | A1 | 11/2011 | Guilloux et al. | |
| 2012/0188504 | A1 | 7/2012 | Petignaud et al. | |
| 2015/0338680 | A1* | 11/2015 | Spratt .................... | G02C 7/024 351/159.76 |
| 2017/0108709 | A1 | 4/2017 | Woodland et al. | |
| 2017/0363883 | A1* | 12/2017 | Fricker .................. | G02C 7/024 |
| 2021/0117588 | A1 | 4/2021 | Welscher | |

FOREIGN PATENT DOCUMENTS

| | | | |
|---|---|---|---|
| CN | 102902078 | A | 1/2013 |
| CN | 106537228 | A | 3/2017 |
| EP | 1 950 601 | | 7/2008 |
| EP | 2 028 527 | | 2/2009 |
| EP | 3 663 838 | | 6/2020 |
| WO | 2019/185848 | A1 | 10/2019 |
| WO | 2020002355 | A1 | 1/2020 |

OTHER PUBLICATIONS

Office Action, issued in Chinese Patent Application No. 202180051391.8 dated Apr. 30, 2025.
International Search Report for PCT/EP2021/077020, mailed Jan. 7, 2022, 4 pages.
Written Opinion of the ISA for PCT/EP2021/077020, mailed Jan. 7, 2022, 7 pages.
Extended Search Report for EP20206207, dated Mar. 29, 2021, 8 pages.
Sun et al., "Ophthalmic lens design with the optimization of the aspherical coefficients," Optical Engineering, Apr. 2000, vol. 39, No. 4, pp. 978-988.

* cited by examiner

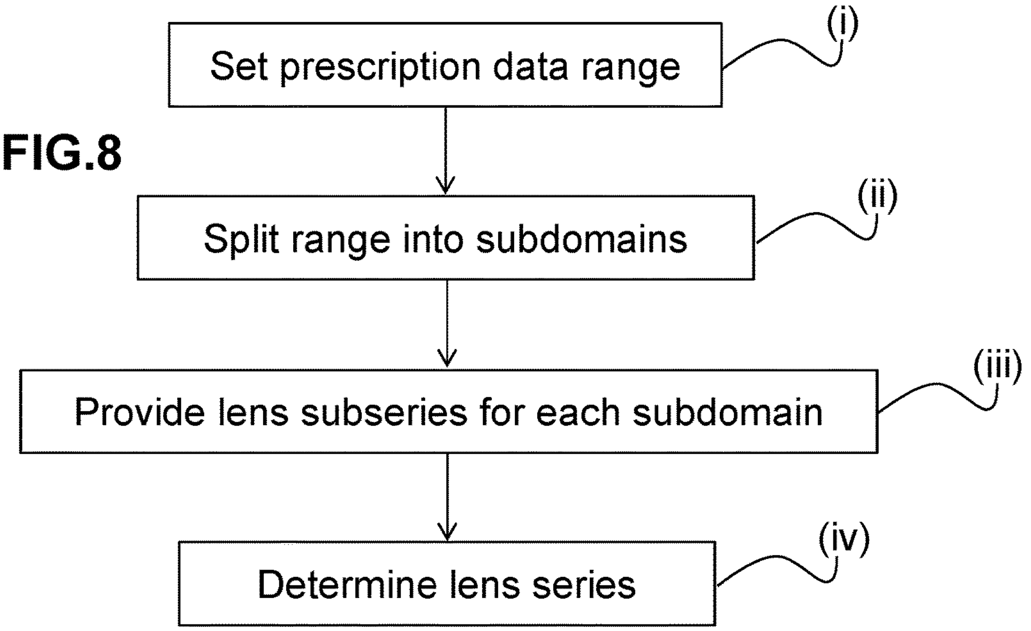
FIG.8
FIG.9
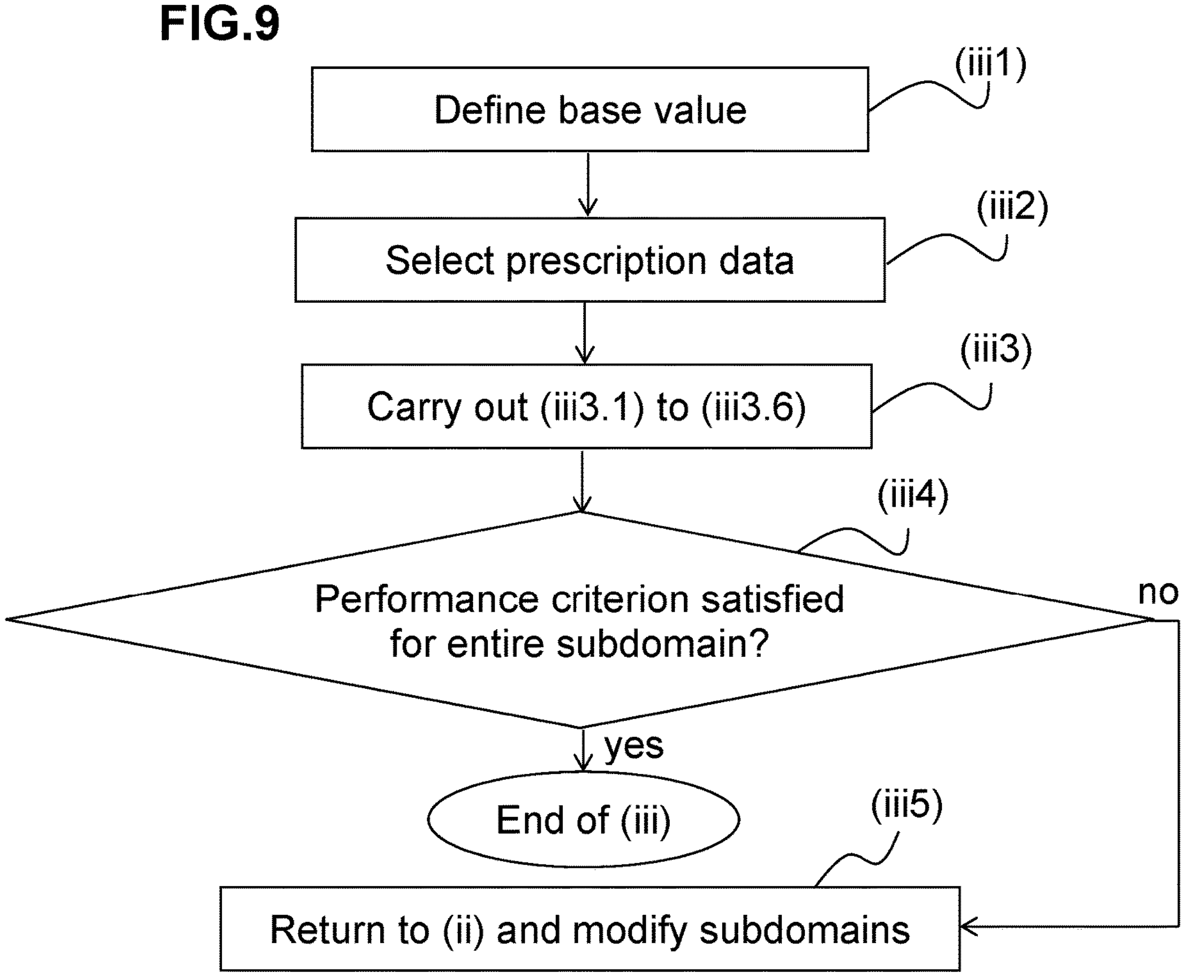
Define base value
(iii1)
Select prescription data
(iii2)
Carry out (iii3.1) to (iii3.6)
(iii3)
Performance criterion satisfied for entire subdomain?
(iii4)
yes
no
End of (iii)
Return to (ii) and modify subdomains
(iii5)

COMPUTER-IMPLEMENTED METHOD FOR PROVIDING A FINISHED SINGLE VISION OPHTHALMIC LENS

This application is the U.S. national phase of International Application No. PCT/EP2021/077020 filed Sep. 30, 2021, which designated the U.S. and claims priority to EP patent application Ser. No. 20/306,207.0 filed Oct. 14, 2020, the entire contents of each of which are hereby incorporated by reference.

FIELD OF THE DISCLOSURE

The present disclosure relates to a computer-implemented method for providing a finished single vision ophthalmic lens.

The present disclosure also relates to a corresponding computer-implemented method for determining a series of finished ophthalmic lenses.

The present disclosure further relates to an associated finished single vision ophthalmic lens and to an associated computer program product.

BACKGROUND OF THE DISCLOSURE

Single vision lenses, i.e. lenses that are designed to provide a single dioptric power, represent the major part of ophthalmic lenses on the market regarding the number of lenses produced.

This big number of lenses can only be achieved by industrial means that are able to provide huge production series of lenses i.e. mass production of stocks of finished lenses.

Currently, optical performances on those single vision finished stock lenses range from poor to medium. Due to the casting or injection technology and mass production series, the lenses cannot be personalized as much and as well as they are in prescription or surfaced series.

On the other hand, the personalizing process in prescription or surfaced series is much more expensive. Moreover, such process cannot address the important volumes of lenses needed by the market.

The best performances for mass production stock finished lenses are currently obtained for aspheric lenses, i.e. lenses having a rotationally symmetric surface on the front side or on the back side of the lens, with a sphere value varying from the center to the periphery of the lens.

In the prior art, optical performances are often optimized based on an evaluation of aberrations. This may lead to good performances in the optics or lens geometry, but it does not make it possible to reach the performances of a personalized lens produced with surfacing technology.

For example, in an article entitled "Ophthalmic lens design with the optimization of the aspherical coefficients" published in April 2000 in Opt. Eng. 39(4), pages 978-988, Wen-Shing Sun et al. describe an asphere surface optimization that avoids inflexion points on the surface.

That document shows that optical quality or geometries obtained for aspheric lenses are quite good. However, the described prior art method does not take into account any distance object and does not provide any hint as to how high performance lenses can be provided by using a mass production process.

Therefore, there is an unfulfilled need to obtain, by using a simple mass production process, the best optical design for an aspheric finished single vision ophthalmic lens that can deliver a controlled optical performance.

SUMMARY OF THE DISCLOSURE

An object of the disclosure is to overcome at least some of the above-mentioned limitations of the prior art and fulfill the above-mentioned need.

To that end, the disclosure provides a computer-implemented method for providing a finished single vision ophthalmic lens intended for a wearer, from a target lens having at least one complex surface, the finished lens having a rotationally symmetrical front surface, wherein the method comprises:

- (a) providing, either wearer data including prescription data relating to an eye of the wearer, or theoretical data from a computer simulation including prescription data relating to a virtual eye;
- (b) defining targeted optical or geometrical characteristics along a predetermined path on the target lens, based on the wearer data or on the theoretical data;
- (c) determining the finished single vision ophthalmic lens by:
  - (c1) selecting an initial lens complying with the prescription data and having a rotationally symmetrical front surface and a predetermined curvature at a prescription reference point;
  - (c2) defining a current lens as the initial lens;
  - (c3) modifying a front surface definition of the current lens to reach the targeted optical or geometrical characteristics until an ending criterion is met;
- (d) providing the finished single vision ophthalmic lens as the current lens.

The above steps provide a lens that can be easily implemented in a mass production process because the lens has a rotationally symmetrical surface, which is simple and not expensive to produce.

This makes it possible to produce lenses having targeted optical or geometrical characteristics that will provide performances comparable to those of a Rx i.e. prescription lens obtained by a surfacing technology in a laboratory, but without the cost of implementing such surfacing technology.

Therefore, the proposed method provides high performance cost-efficient lenses in great numbers answering the needs of the market.

Furthermore, by taking into account the above-mentioned data and characteristics, the proposed method makes it possible to deliver a lens having optimized optical performances in both far and near vision directions. In particular, it may take into account specific distance objects that are defined according to eye sight direction from top to bottom and lens positioning in front of the wearer's eye.

Besides, the proposed method provides a single vision lens comprising a rotationally symmetric front surface without having any cylinder, and a back surface providing cylinder if any.

To the same end, the disclosure also proposes a method for determining a series of finished ophthalmic lenses having a rotationally symmetrical front surface, wherein the method comprises:

- (i) setting a range of values of prescription data of the finished ophthalmic lenses of the series;
- (ii) splitting the range into a predetermined number of subdomains of values of prescription data;

(iii) for each of the subdomains, providing a subseries of finished ophthalmic lenses of the series, by:
- (iii1) defining a base value representative of a surface curvature at the optical center of a front surface of a finished ophthalmic lens of the subseries, according to optical and/or geometrical requirements;
- (iii2) selecting prescription data representative of the subdomain;
- (iii3) providing the subseries by:
  - (iii3.1) defining targeted optical or geometrical characteristics along a predetermined path on a target lens, based on the prescription data representative of the subdomain, the target lens having at least one complex surface;
  - (iii3.2) selecting an initial lens complying with the prescription data representative of the subdomain and having a rotationally symmetrical front surface and a predetermined surface curvature at a prescription reference point;
  - (iii3.3) defining a current lens as the initial lens;
  - (iii3.4) modifying a front surface definition of the current lens to reach the targeted optical or geometrical characteristics until an ending criterion is met;
  - (iii3.5) providing a finished ophthalmic lens of the subseries as the current lens;
  - (iii3.6) providing the subseries of finished ophthalmic lenses as all having a same front surface consisting of the modified front surface meeting the ending criterion and different sphero-toric back surfaces respectively corresponding to all the prescription data of the subdomain;
- (iii4) checking that the subseries satisfies a predetermined performance criterion for all the prescription data of the subdomain;
- (iii5) returning to splitting step (ii) and modifying the subdomains if the predetermined performance criterion is not met for all the prescription data of the subdomain;

(iv) determining the series as the subseries provided for all of the subdomains.

To the same end, the disclosure also provides a finished single vision ophthalmic lens intended for a wearer, wherein the lens has a rotationally symmetrical front surface and a back surface from a target lens having at least one complex surface, the finished single vision ophthalmic lens being provided by:

(a) providing, either wearer data including prescription data relating to an eye of the wearer, or theoretical data from a computer simulation including prescription data relating to a virtual eye;

(b) defining targeted optical or geometrical characteristics along a predetermined path on the target lens, based on the wearer data or on the theoretical data;

(c) determining the finished single vision ophthalmic lens by:
- (c1) selecting an initial lens complying with the prescription data and having a rotationally symmetrical front surface and a predetermined curvature at a prescription reference point;
- (c2) defining a current lens as the initial lens;
- (c3) modifying a front surface definition of the current lens to reach the targeted optical or geometrical characteristics until an ending criterion is met;

the finished single vision ophthalmic lens being the current lens that meets the ending criterion.

To the same end, the disclosure further provides a computer program product comprising instructions that, when executed by a processor, cause the processor to provide a finished single vision ophthalmic lens intended for a wearer, from a target lens having at least one complex surface, the finished lens having a rotationally symmetrical front surface, by:

(a) providing, either wearer data including prescription data relating to an eye of the wearer, or theoretical data from a computer simulation including prescription data relating to a virtual eye;

(b) defining targeted optical or geometrical characteristics along a predetermined path on the target lens, based on the wearer data or on the theoretical data;

(c) determining the finished single vision ophthalmic lens by:
- (c1) selecting an initial lens complying with the prescription data and having a rotationally symmetrical front surface and a predetermined curvature at a prescription reference point;
- (c2) defining a current lens as the initial lens;
- (c3) modifying a front surface definition of the current lens to reach the targeted optical or geometrical characteristics until an ending criterion is met;

(d) providing the finished single vision ophthalmic lens as the current lens.

According to particular possible features, which may be combined or taken alone, of any of the methods, lens or computer program product or mobile terminal succinctly described above:

- the predetermined path may be an optical path and may extend vertically from −60° to 60°, preferably from −45° to 45°, more preferably from −30° to 30°;
- the step (c) of determining the finished single vision ophthalmic lens may further comprise checking that the current lens satisfies a predetermined performance criterion;
- the predetermined performance criterion may relate to a root mean square deviation of at least one of the optical characteristics along the predetermined path;
- the root mean square deviation may be lower than 0.12 diopter, preferably lower than 0.06 diopter, more preferably lower than 0.03 diopter;
- the step (c3) of modifying the front surface definition of the current lens may comprise modifying the curvature of the current lens along the rotational symmetry axis of the front surface of the current lens;
- the targeted optical characteristics may comprise a predetermined distribution of a mean power and astigmatism in the target lens;
- the targeted geometrical characteristics may comprise either a predetermined distribution of a mean curvature of a front surface of the target lens, or a minimum curvature and an axis orientation of the front surface of the target lens, or a maximum curvature and an axis orientation of the front surface of the target lens, or at the same time a predetermined distribution of a mean curvature of the front surface of the target lens, a minimum and maximum curvature and an axis orientation of the front surface of the target lens;
- in a first particular embodiment, the step (c3) of modifying the front surface definition of said current lens may comprise:
- defining a representative optical path in the front surface of the current lens, the representative optical path being representative of an eye sight orientation when the wearer is looking upward or downward to switch between far vision and near vision;

evaluating optical characteristics of the current lens along the representative optical path;

determining the front surface of the current lens that, in combination with a sphero-toric back surface of the current lens, provides values of optical characteristics along an optical path that are the closest to values of the targeted optical characteristics along the representative optical path;

defining a modified front surface of the current lens as the determined front surface;

the representative optical path may comprise a predetermined number of path segments covering areas for far vision use and/or for near vision use;

the representative optical path may comprises two path segments covering an area for far vision use that extends from −10° to 0° and an area for near vision use that extends from 16° to 28°;

in a second particular embodiment, the step (c3) of modifying the front surface definition of said current lens may comprise:

defining a representative surfacic path on the front surface of the current lens, the representative surfacic path being representative of an eye sight orientation when the wearer is looking upward or downward to switch between far vision and near vision;

evaluating a curvature of the front surface of the current lens along the representative surfacic path;

determining the front surface of the current lens that provides values of geometrical characteristics along a surfacic path that are the closest to values of the targeted geometrical characteristics along the representative surfacic path;

defining a modified front surface of the current lens as the determined front surface.

As the method for determining a series of finished ophthalmic lenses, as well as the finished single vision ophthalmic lens and the computer program product succinctly described above have the same advantages as the method for providing a finished single vision ophthalmic lens, those advantages are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 8 is a flow diagram showing steps of a method for determining a series of finished ophthalmic lenses according to the disclosure, in a particular embodiment.

FIG. 9 is a flow diagram showing details of a step of providing a subseries of finished ophthalmic lenses, in the embodiment of FIG. 8.

DETAILED DESCRIPTION OF THE DISCLOSURE

Figure 1:
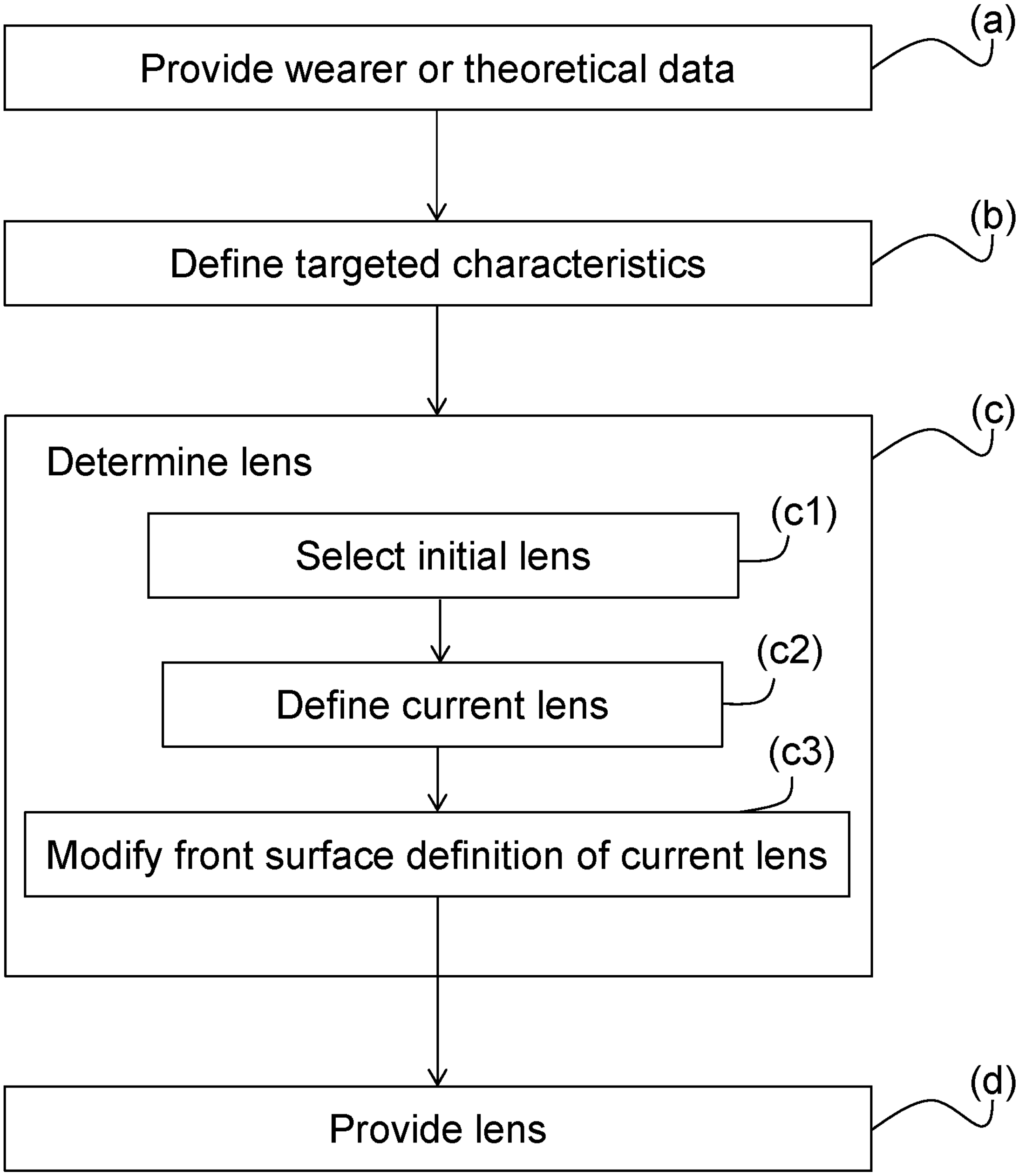
FIG. 1 is a flow diagram showing steps of a method for providing a finished single vision ophthalmic lens according to the disclosure, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms “comprise” (and any grammatical variation thereof, such as “comprises” and “comprising”), “have” (and any grammatical variation thereof, such as “has” and “having”), “contain” (and any grammatical variation thereof, such as “contains” and “containing”), and “include” (and any grammatical variation thereof such as “includes” and “including”) are open-ended linking verbs. They are used to specify the presence of stated features, integers, steps or components or groups thereof, but do not preclude the presence or addition of one or more other features, integers, steps or components or groups thereof. As a result, a method, or a step in a method, that “comprises”, “has”, “contains”, or “includes” one or more steps or elements possesses those one or more steps or elements, but is not limited to possessing only those one or more steps or elements.

In addition, in the present disclosure, terms like “up”, “bottom”, “horizontal”, “vertical”, “above”, “below”, “front”, “rear” or any other words indicating a relative position are to be understood as perfectly well defined in the most common wearing conditions of an ophthalmic lens, where the wearer is standing or seated.

The flow diagram of FIG. 1 shows steps of a particular embodiment of the method according to the present disclosure for providing a finished single vision ophthalmic lens.

The finished single vision ophthalmic lens considered in the present disclosure is for human vision and can provide an optical function to the user i.e. the wearer of the lens.

It can for instance be a corrective lens complying with a given prescription, namely, a power lens of the spherical and/or cylindrical type for an ametropic user, for treating myopia, hypermetropia, astigmatism. It can also be a single vision lens with a given prescription for near vision correction for presbyopia. The expression "prescription reference point" used in the present disclosure refers to the optical center of the lens.

As mentioned above, the single vision lens is designed to provide a single dioptric power. In the case of astigmatism, the single vision lens has two axis, and minimal and maximal powers.

A purpose of the present disclosure is to propose a method for providing a mass production compatible version of an existing single vision ophthalmic lens product having a rotationally symmetrical front surface.

The target ophthalmic lens on the basis of which the finished single vision ophthalmic lens will be provided has at least one complex surface, that is to say, a surface that cannot be described by a simple mathematical function, e.g. a surface having no central or axial symmetry. By way of non-limiting example, the surface of the target lens is neither spherical, nor rotationally aspheric and neither toroidal, nor atoroidal.

This ensures a specific and different management of aberrations for far vision and near vision areas in the lens. Namely, the correction of aberrations will differ for each one of the various points of those areas. Consequently, the complex surface of the target lens will have a specific shape without any particular symmetry.

As shown in FIG. 1, a first step (a) of the method for providing the finished single vision ophthalmic lens is a step of providing, either wearer data, or theoretical data.

The wearer data include prescription data relating to the considered wearer's eye. The wearer data may also include wearing condition, e.g. panto, wrap and vertex data. If wearing condition data are not available, a default value might be used.

The theoretical data include prescription data relating to a virtual eye. They may result from a computer simulation.

Wearer data may possibly be combined with theoretical data and provided together at step (a).

By way of non-limiting example, the prescription data may comprise optical quantities such as wearer power and astigmatism.

For evaluating such optical quantities, a conventional ray path method, also referred to as ray tracing, can be used. In such a case, the performances of the target lens may be evaluated using the object distances and the positioning of the lens in front of the wearer's eye. By way of non-limiting example, the conventional ray path method to evaluate the power and astigmatism may be identical or similar to the method described in document WO-A-2019 185848.

Table 1 below provides a non-limiting example of values of the object proximity, which is defined as the inverse of the distance from the object to the front surface of the lens along the ray path, the distance being expressed in meters, as a function of the eye sight direction, expressed in degrees. The object proximity provides the starting point for the ray path.

TABLE 1

| | | | | | | | | | | | |
|---|---|---|---|---|---|---|---|---|---|---|---|
| Proximity ($m^{-1}$) | 0.0 | 0.0 | 0.0 | 0.0 | 0.0 | 0.0 | 0.0 | 0.0 | 0.0 | 0.0 | 0.0 |
| Direction (°) | −30 | −28 | −26 | −24 | −22 | −20 | −18 | −16 | −14 | −12 | −10 |
| Proximity ($m^{-1}$) | 0.0 | 0.0 | 0.0 | 0.0 | 0.0 | 0.1 | 0.3 | 0.7 | 1.2 | 1.7 | 2.0 |
| Direction (°) | −8 | −6 | −4 | −2 | 0 | 2 | 4 | 6 | 8 | 10 | 12 |
| Proximity ($m^{-1}$) | 2.2 | 2.4 | 2.5 | 2.5 | 2.6 | 2.6 | 2.7 | 2.7 | 2.8 | | |
| Direction (°) | 14 | 16 | 18 | 20 | 22 | 24 | 26 | 28 | 30 | | |

Figure 3:
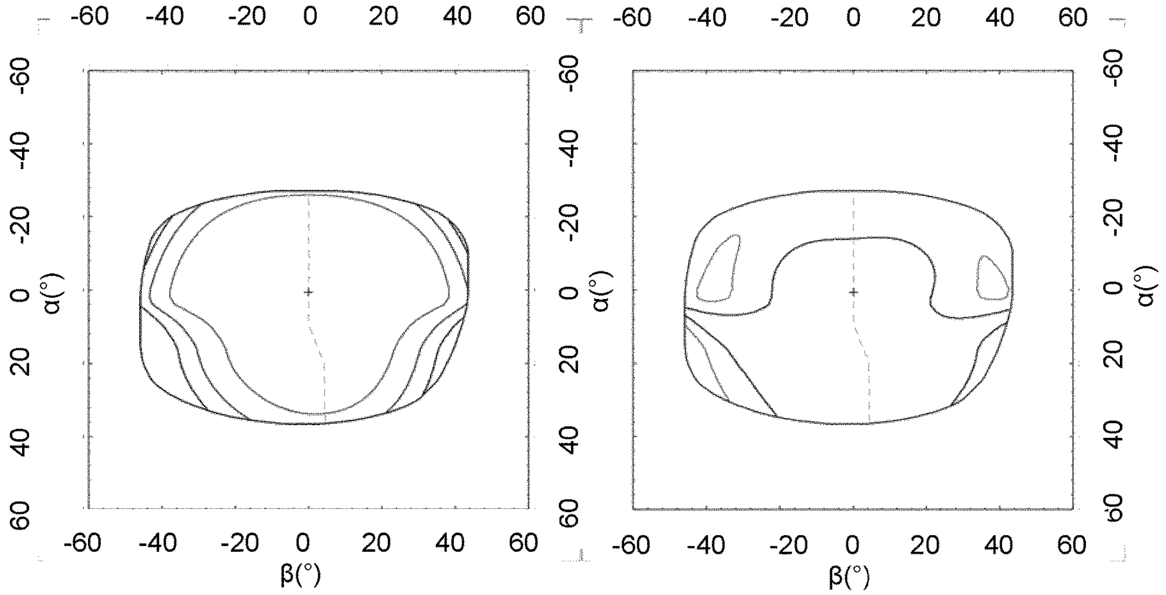
FIG. 3 is a non-limiting example of a pair of optical maps showing respectively a power error and an unwanted astigmatism of a target lens, used in the embodiment of FIG. 2.

FIG. 3 shows a non-limiting example of optical maps respectively for wearer power errors (graph on the left part of the drawing) and unwanted resulting astigmatism (graph on the right part of the drawing), with the following prescription data: −5.00 (0.00) 0°.

In both graphs, the abscissa axis represents the horizontal eyesight direction, named β, in degrees, which is negative for the left side or temporal side of a lens for the right eye and the ordinate axis represents the vertical eyesight direction, named α, in degrees, which is negative for the top of the lens.

The dotted, substantially vertical line in the middle of the lens is the optical path and the cross represents the location of the eye's pupil for the primary gaze direction. Isometric lines are stepped by 0.125 diopter.

In Table 1 above, object distances are defined with respect to the vertical eyesight direction. Thus, for each given eyesight direction in vertical direction, a distance to a fixed object being looked at by the wearer is provided.

By way of non-limiting example, the target lens may be evaluated using the following positioning rules: a pantoscopic angle of 8°, a wrap angle of 0° and an eye-lens distance of 12 mm.

In the example of FIG. 3, the center of the wearer's pupil is located at 4 mm above the optical center of the lens.

As shown in FIG. 1, at step (b), which follows step (a), targeted optical or geometrical characteristics are defined along a predetermined path on the above-mentioned target lens, based on the wearer data or on the theoretical data or both.

By non-limiting example, the target lens may be identical or similar to the lens described in document WO-A-2019 185848. In that example, the complex surface of the target lens according to the present disclosure is the surface without any revolution axis that has optical characteristics identical or close to those of the lens described in document WO-A-2019 185848.

In an embodiment, the predetermined path may be an optical path and may extend vertically from −60° to 60°, preferably from −45° to 45°, more preferably from −30° to 30°.

In another embodiment, instead of considering a one-dimension path along the optical path, the targeted optical characteristics may be defined by considering a two-dimension area, defined with eyesight direction dimensions vertically and horizontally, from top to bottom and from the left to the right of the lens. The referential shown in the optical maps of FIG. 3 may be used.

The two-dimension area in that referential may be defined by a circle having a 30° radius centered at the point for which the wearer's eye looks straight forward: α=0°, β=0°. The radius value may be selected in a range from 18° to 70°, preferably from 24° to 50°, more preferably from 30° to 40°. The corresponding disk may be sampled with a mesh for which each point is evenly spaced, e.g. by 1° steps, in α and β directions. All the mesh points within the disk are then used for evaluating the optical characteristics at those points.

In an embodiment, the targeted optical characteristics may comprise a predetermined distribution of a mean power and astigmatism in the target lens.

In an embodiment, the targeted geometrical characteristics may comprise, either a predetermined distribution of a mean curvature of the front surface of the target lens, or a minimum curvature and an axis orientation of the front surface of the target lens, or a maximum curvature and an axis orientation of the front surface of the target lens, or at the same time a predetermined distribution of a mean curvature of the front surface of the target lens, a minimum and maximum curvature and an axis orientation of the front surface of the target lens.

The following step (c) consists in determining the finished single vision ophthalmic lens by carrying out steps (c1), (c2) and (c3) as follows.

At step (c1), an initial lens is selected, having a rotationally symmetrical front surface and a predetermined surface curvature at a prescription reference point and complying with the above-mentioned prescription data.

By way of non-limiting example, the optical center of the lens may be chosen as the prescription reference point.

Next, at step (c2), a lens optimizing process begins by defining a current lens. At the beginning of the optimizing process, the current lens is the initial lens selected at step (c1).

Then, at step (c3), the optimizing process consists of minimizing, by iterations, differences between the optical or geometrical characteristics of the current lens and the optical or geometrical characteristics of the target lens, i.e. the targeted optical or geometrical characteristics defined at step (b).

Such minimizing is obtained by modifying at each iteration the definition of the front surface of the current lens to reach the targeted optical or geometrical characteristics.

In an embodiment, the definition of the front surface of the current lens may be modified by carrying out steps comprising modifying the curvature of the current lens along the rotational symmetry axis of that front surface.

As a variant, the front surface of the current lens might remain rotationally symmetrical when the curvature of the front surface is modified along the rotational symmetry axis.

Figure 2:
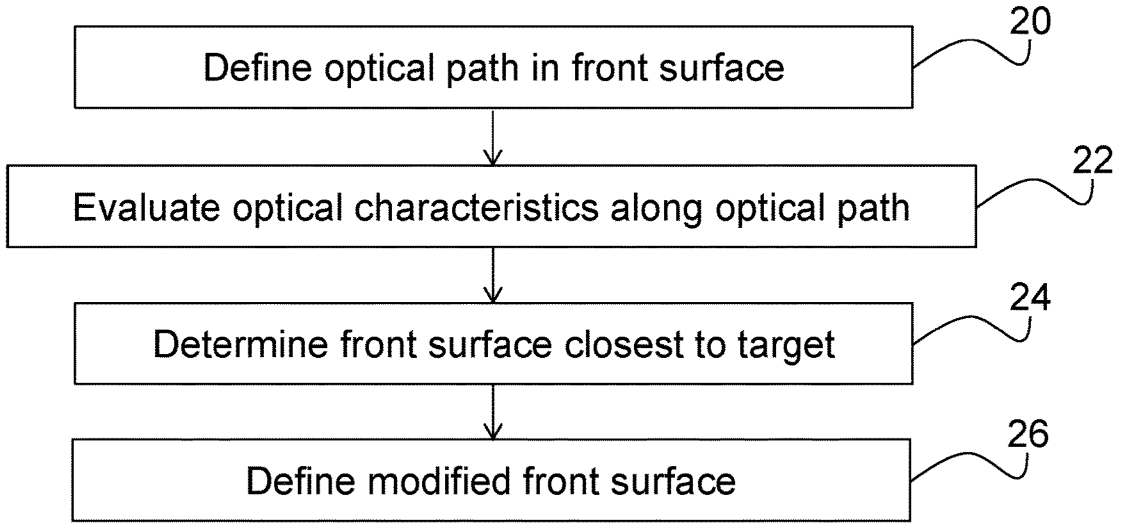
FIG. 2 is a flow diagram showing details of a step of modifying a front surface definition of a lens, comprised in the method for providing a finished single vision ophthalmic lens according to the disclosure, in a first particular embodiment.

FIG. 2 shows steps 20, 22, 24 and 26 of a first particular embodiment of step (c3), where targeted optical characteristics have been defined at step (b).

At step 20, a representative optical path is defined in the current lens. That optical path is representative of an eye sight orientation when the wearer of the lens is looking upward or downward to switch between far vision and near vision. In other words, the optical path represents the way in which the wearer of the lens browses in the lens when looking from far distance to close distance.

The optical path may be built by drawing a vertical straight line from the top to the bottom of the lens.

By way of non-limiting example, the representative optical path may comprise a predetermined number of path segments covering areas for far vision use or for near vision use, or both for far vision use and near vision use.

For instance, the representative optical path may comprise two path segments covering an area for far vision use that extends from −10° to 0° and an area for near vision use that extends from 16° to 28°.

In another non-limiting example, the optical path may comprise three path segments, which are set according to selected optical points. Namely, it may depend on the positioning of the far vision points and the near vision points.

In that example, the first path segment is a vertical segment line from the top of the lens to the far vision point of the lens, the second path segment is a segment line joining the far vision point and the near vision point and the third path segment is a vertical segment line from the near vision point to the bottom of the lens.

The far vision point is centered at the geometrical center of the lens. The geometrical center of the lens is also corresponding to the optical center of the lens. Near vision location is set in horizontal and vertical directions.

For the horizontal direction, the location of the near vision point is calculated according to the convergence of the eyes when the wearer is looking at close distances. The calculation includes a set of parameters such as lens prescription, lens base curve, lens positioning, inter-pupillary distance of the wearer, object distances, eye sight direction (eyes convergence) and refractive index of the lens material. For individual parameters, average values may be used.

For the vertical direction, the location of the near vision point is established according to distance object usage. In the non-limiting example being described and as shown in Table 1 above, it may be set that the wearer lowers his/her eyesight by about 20° to use objects at 0.4 m (the inverse of the distance thus being 2.5). Such orientation fits in average for most of the daily usages in near vision tasks. This will thus set the near vision orientation.

The definition of the shape of the optical path may also depend on the usage and/or on the complexity of the considered lens.

Next, at step 22, optical characteristics of the current lens are evaluated along the representative optical path defined at step 20.

As shown in the optical maps of FIG. 3, for each gaze direction, from top to bottom, i.e. between −30° and 30°, the target lens provides values shown in Table 2 and Table 3 below.

Each table contains data for gaze direction, expressed in degrees and mean power (Table 2) or resulting astigmatism denoted Asr (Table 3), both expressed in diopters D. Those values will be used as target quantities during the optimizing process described in the present disclosure.

TABLE 2

| | | | | | | | | | |
|---|---|---|---|---|---|---|---|---|---|
| α direction (°) | 38 | 36 | 34 | 32 | 30 | 28 | 26 | 24 | 22 |
| Power (D) | −4.79 | −4.84 | −4.87 | −4.90 | −4.93 | −4.95 | −4.96 | −4.98 | −4.99 |
| α direction (°) | 20 | 18 | 16 | 14 | 12 | 10 | 8 | 6 | 4 |
| Power (D) | −5.00 | −5.01 | −5.01 | −5.01 | −5.01 | −5.00 | −5.00 | −4.99 | −4.98 |
| α direction (°) | 2 | 0 | −2 | −4 | −6 | −8 | −10 | −12 | −14 |
| Power (D) | −4.98 | −4.98 | −4.97 | −4.97 | −4.97 | −4.97 | −4.96 | −4.96 | −4.95 |
| α direction (°) | −16 | −18 | −20 | −22 | −24 | −26 | −28 | | |
| Power (D) | −4.95 | −4.94 | −4.93 | −4.91 | −4.90 | −4.87 | −4.85 | | |

TABLE 3

| | | | | | | | | | |
|---|---|---|---|---|---|---|---|---|---|
| α direction (°) | 38 | 36 | 34 | 32 | 30 | 28 | 26 | 24 | 22 |
| Asr (D) | 0.02 | 0.01 | 0.02 | 0.02 | 0.03 | 0.03 | 0.03 | 0.03 | 0.03 |
| α direction (°) | 20 | 18 | 16 | 14 | 12 | 10 | 8 | 6 | 4 |
| Asr (D) | 0.03 | 0.02 | 0.02 | 0.01 | 0.01 | 0.00 | 0.00 | 0.00 | 0.00 |
| α direction (°) | 2 | 0 | −2 | −4 | −6 | −8 | −10 | −12 | −14 |
| Asr (D) | 0.01 | 0.02 | 0.03 | 0.04 | 0.06 | 0.07 | 0.09 | 0.11 | 0.13 |
| α direction (°) | −16 | −18 | −20 | −22 | −24 | −26 | −28 | | |
| Asr (D) | 0.14 | −0.16 | −0.17 | −0.19 | −0.20 | −0.21 | −0.21 | | |

Then, step 24 consists in determining, for the current lens, the front surface that, in combination with a sphero-toric back surface, provides values of optical characteristics along an optical path that are optimized i.e. that are the closest to values of the targeted optical characteristics along the representative optical path defined at step 20. By way of non-limiting example, the front surface may be rotationally symmetrical.

Those values of the optical characteristics may be evaluated along the defined optical path using the same ray path method as described above with reference to FIG. 1 and Table 1.

By way of non-limiting example, the front surface element Z(x,y) to be optimized is a rotationally symmetrical front surface defined by the following equation, where the coefficients $K_1, K_2, \ldots, K_Q$ are the results of the optimizing process:

$$Z(x, y) = \frac{r^2}{R\left(1 + \sqrt{1 - (1 + K_1)\frac{r^2}{R^2}}\right)} + \sum_{i=2}^{Q} K_i r^{2i}$$

$$\text{with } r = \sqrt{(x^2 + y^2)},$$

where x is the horizontal eyesight direction (e.g. in mm), y is the vertical eyesight direction (e.g. in mm) and R is the radius at the center of the front surface.

Last, at step 26, the modified front surface of the current lens is defined as the front surface determined at step 24.

Figure 5:
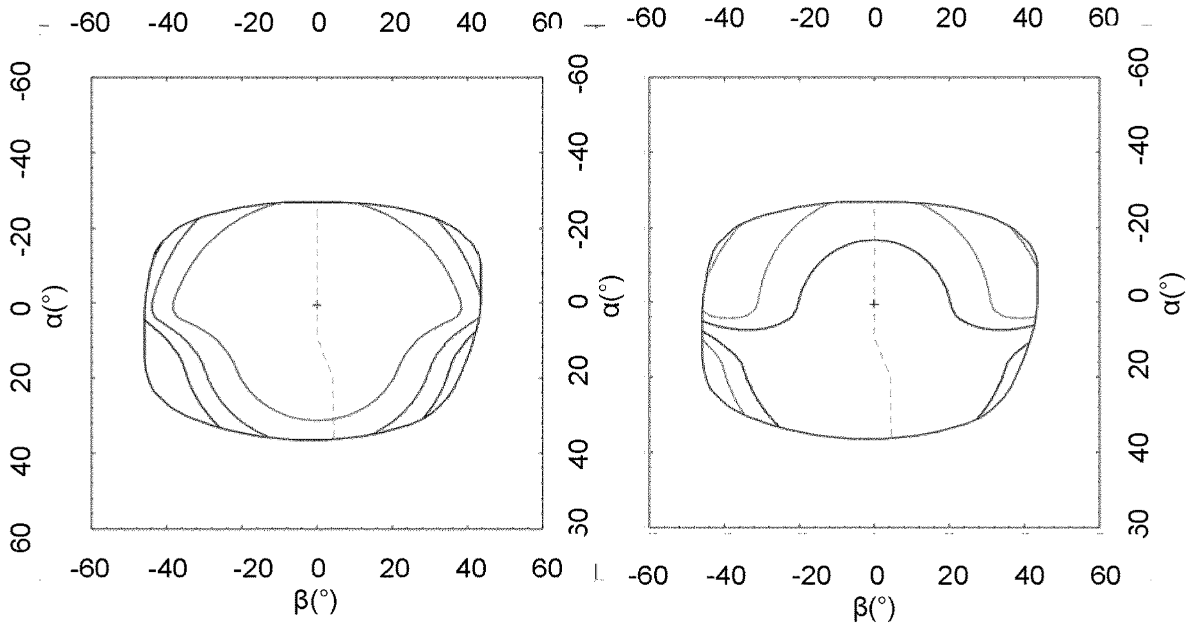
FIG. 5 is a non-limiting example of a pair of optical maps showing respectively a power error and an unwanted astigmatism of an optimized lens, obtained when an ending criterion is met, in the embodiment of FIG. 2.

FIG. 5 shows non-limiting examples of the obtained optimized lens. The definition of the abscissa and ordinate axes of the optical maps shown in FIG. 5, as well as the definition of the dotted line and cross, is the same as in FIG. 3 described above.

Tables 4 and 5 below provide values obtained upon evaluation of power and resulting astigmatism along the optical path for the optimized lens.

TABLE 4

| | | | | | | | | | |
|---|---|---|---|---|---|---|---|---|---|
| α direction (°) | 38 | 36 | 34 | 32 | 30 | 28 | 26 | 24 | 22 |
| Power (D) | −4.75 | −4.79 | −4.83 | −4.86 | −4.89 | −4.91 | −4.93 | −4.94 | −4.95 |
| α direction (°) | 20 | 18 | 16 | 14 | 12 | 10 | 8 | 6 | 4 |
| Power (D) | −4.96 | −4.97 | −4.97 | −4.98 | −4.98 | −4.97 | −4.97 | −4.97 | −4.96 |
| α direction (°) | 2 | 0 | −2 | −4 | 6 | −8 | −10 | −12 | −14 |
| Power (D) | −4.96 | −4.96 | −4.95 | −4.95 | −4.95 | −4.95 | −4.95 | −4.95 | −4.94 |
| α direction (°) | −16 | −18 | −20 | −22 | −24 | −26 | −28 | | |
| Power (D) | −4.94 | −4.93 | −4.93 | −4.92 | −4.91 | −4.89 | −4.87 | | |

TABLE 5

| | | | | | | | | | |
|---|---|---|---|---|---|---|---|---|---|
| α direction (°) | 38 | 36 | 34 | 32 | 30 | 28 | 26 | 24 | 22 |
| Asr (D) | 0.05 | 0.02 | 0.01 | 0.01 | 0.02 | 0.03 | 0.03 | 0.03 | 0.03 |
| α direction (°) | 20 | 18 | 16 | 14 | 12 | 10 | 8 | 6 | 4 |
| Asr (D) | 0.03 | 0.03 | 0.02 | 0.02 | 0.01 | 0.00 | 0.00 | 0.00 | 0.00 |
| α direction (°) | 2 | 0 | −2 | −4 | 6 | −8 | −10 | −12 | −14 |
| Asr (D) | 0.00 | 0.00 | 0.01 | 0.02 | 0.03 | 0.05 | 0.06 | 0.08 | 0.10 |
| α direction (°) | −16 | −18 | −20 | −22 | −24 | −26 | −28 | | |
| Asr (D) | 0.12 | −0.14 | −0.16 | −0.18 | −0.21 | −0.23 | −0.24 | | |

By way of non-limiting example, the complex surface of the target lens may be the back surface thereof.

Figure 4:
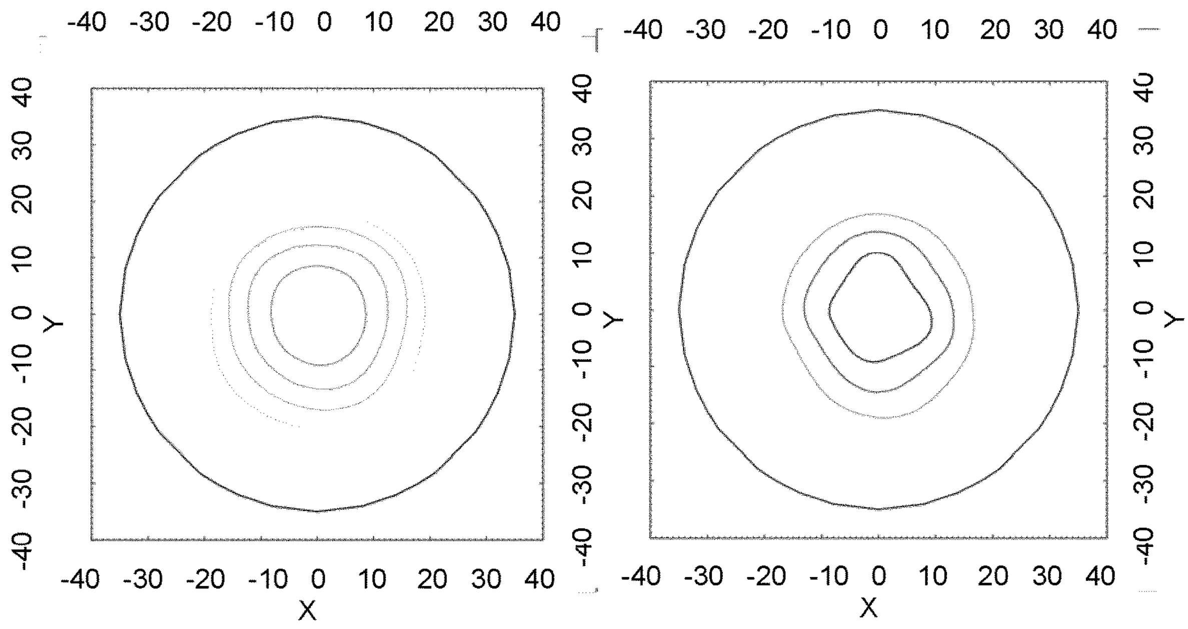
FIG. 4 shows a non-limiting example of mean sphere and cylinder maps of a front or back surface of a target lens, in the embodiment of FIG. 2.

FIG. 4 shows non-limiting examples of mean sphere and cylinder maps of the front or back surface of the target lens. The mean sphere map is shown on the left part of the drawing and the cylinder map is shown on the right part of the drawing.

In both graphs of FIG. 4, the abscissa axis X represents the horizontal eyesight direction, in mm. The ordinate axis Y represents the vertical eyesight direction, in mm. Isometric lines are stepped by 0.125 diopter. In the non-limiting example shown in the drawing, the radius of the front sphere is 312.38 mm, the material of the lens has a refractive index of 1.601 and the thickness at the optical center of the lens is 1.4 mm.

Figure 6:
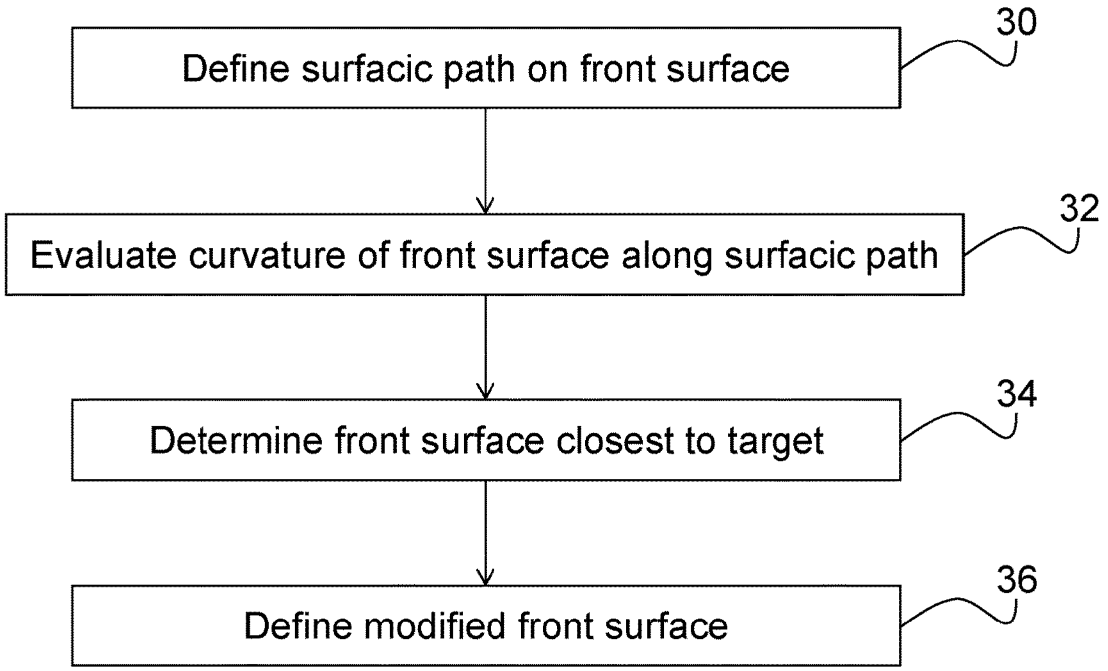
FIG. 6 is a flow diagram showing details of a step of modifying a front surface definition of a lens, comprised in a method for providing a finished single vision ophthalmic lens according to the disclosure, in a second particular embodiment.

FIG. 6 shows steps 30, 32, 34 and 36 of a second particular embodiment of step (c3), where targeted geometrical characteristics have been defined at step (b).

At step 30, a representative surfacic path is defined on the front surface of the current lens. Similarly to the optical path defined at step 20 in the above-described first embodiment, the surfacic path is representative of an eye sight orientation when the wearer of the lens is looking upward or downward to switch between far vision and near vision.

Each gaze direction, from the top to the bottom of the lens, can be converted into a point located on the front surface, by a conventional ray tracing method. Therefore, the optical path of the first embodiment described previously can be transformed into a surfacic path in the second embodiment. The surfacic path may be as long as the optical path, or it may be shorter, or it may be split into several sub-paths.

The surfacic path provides a set of tables of surfacic values representative of the front surface of the lens.

Next, at step 32, the curvature of the front surface of the current lens is evaluated along the representative surfacic path defined at step 30. The curvature might be a mean curvature of the front surface of the current lens, or a minimum curvature and an axis orientation of the front surface of the current lens, or a maximum curvature and an axis orientation of the front surface of the current lens.

Each set of surfacic values representative of the front surface contains data for (x,y) locations on the front surface and curvature values evaluated at those points on the front surface.

Figure 7:
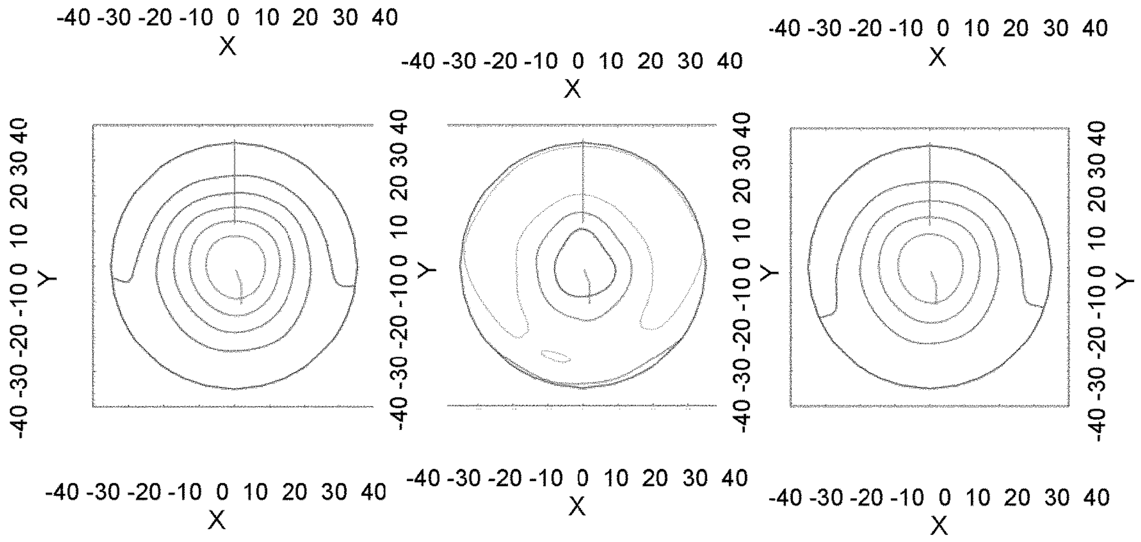
FIG. 7 is a non-limiting example of surfacic maps showing respectively mean sphere, cylinder and mean curvature used in a step of evaluating an ending criterion, in the embodiment of FIG. 6.

FIG. 7 shows non-limiting examples of three surfacic maps (X,Y) representing different surfacic i.e. geometrical characteristics that may be evaluated on the front complex surface of the target lens, as follows.

The graph on the left of the drawing shows the mean sphere, where isometric lines are stepped by 0.125 D.

The graph in the middle of the drawing shows the cylinder, where isometric lines are also stepped by 0.125 D.

The graph on the right of the drawing shows the mean curvature, where isometric lines are stepped by 0.25 $m^{-1}$.

The lines that are substantially in the middle of each graph represent the locations on the front surface where the surfacic i.e. geometric characteristics may be picked up for evaluation.

By way of non-limiting example, Tables 6 and 7 below are obtained from the mean curvature map for the target lens in that second embodiment. Tables 6 and 7 show an example in which the surfacic path is not a straight vertical line and therefore, the values of the X axis are not indicated.

Table 6 corresponds to far vision and Table 7 to near vision.

TABLE 6

| Y axis (mm) | −11 | −9.9 | −8.9 | −7.9 | −6.9 | −5.9 | −4.9 |
|---|---|---|---|---|---|---|---|
| Mean curvature ($m^{-1}$) | 2.85 | 2.80 | 2.76 | 2.73 | 2.69 | 2.66 | 2.63 |

| Y axis (mm) | −3.9 | −2.9 | −1.9 | −0.9 |
|---|---|---|---|---|
| Mean curvature ($m^{-1}$) | 2.61 | 2.59 | 2.57 | 2.56 |

TABLE 7

| Y axis (mm) | 12 | 13 | 14 | 15 | 16 | 17 | 18 | 19 | 20 |
|---|---|---|---|---|---|---|---|---|---|
| Mean curvature ($m^{-1}$) | 2.93 | 2.99 | 3.04 | 3.09 | 3.15 | 3.20 | 3.26 | 3.31 | 3.36 |

| Y axis (mm) | 21 | 22 | 23 | 24 | 25 | 26 | 27 | 28 | 29 |
|---|---|---|---|---|---|---|---|---|---|
| Mean curvature ($m^{-1}$) | 3.41 | 3.45 | 3.50 | 3.54 | 3.58 | 3.62 | 3.66 | 3.69 | 3.73 |

| Y axis (mm) | 30 | 31 | 32 | 33 | 34 | 35 | 36 |
|---|---|---|---|---|---|---|---|
| Mean curvature ($m^{-1}$) | 3.75 | 3.75 | 3.75 | 3.75 | 3.74 | 3.74 | 3.73 |

Similarly to the first embodiment, those tables corresponding to the target lens are used in an optimizing step, which is step 34 shown in FIG. 6.

As a variant, an alternative table may be used, obtained from a table of the type of Table 7, by skipping the horizontal location and setting that location to x=0 mm for any data of the target lens table. In that variant, the locations where to apply the optimization values in the optimized lens are extracted from a straight line from the top to the bottom of the lens.

As shown in FIG. 6, step 34 following step 32 consists in determining, for the current lens, the front surface that provides values of geometrical characteristics along a surfacic path that are the closest to values of the targeted geometrical characteristics along the representative surfacic path defined at step 30.

In the non-limiting example shown in the drawing, the radius of the back sphere is 92.01 mm, the material of the lens has a refractive index of 1.601 and the thickness at the optical center of the lens is 1.4 mm.

Last, at step 36, the modified front surface of the current lens is defined as the front surface determined at step 34.

In both the first and the second embodiments, as shown in FIG. 1, step (c3) ends when an ending criterion is met.

In an embodiment, the ending criterion may be a predetermined number of iterations.

By way of non-limiting example, the number of iterations may be set to 10 or 20.

In another embodiment, the ending criterion may be defined as a value of a difference between the optical or geometrical characteristics of the lens and the targeted optical or geometrical characteristics, i.e. deviations of the optical or geometrical characteristics of the current lens compared to the target lens. By way of non-limiting example, the deviation may be a root mean square deviation.

By way of non-limiting example, the ending criterion may be defined as the value of a merit function representing those deviations and the optimizing process consists in minimizing that value, so that step (c3) ends when the value of the merit function is lower than a given quantity.

Thus, for a set of points on the lens or of the eyesight directions, identified by a variable i, the merit function may take the following form:

$$\sum p_i \cdot \sum w_{ij} \cdot (L_{ij} - T_{ij})^2$$

where:

$p_i$ is a weighting of the point i, $L_{ij}$ is the value of the j-th type of optical or geometrical characteristic at the point i, $T_{ij}$ is the target value of the j-th type of optical or geometrical characteristic at the point i, $w_{ij}$ is the weighting of the j-th type of optical or geometrical characteristic at the point i.

By way of non-limiting example, 120 points may be defined along the optical or surfacic path.

In another non-limiting example, 15 points, preferably 30 points, more preferably 40 points, may be defined along the optical or surfacic path.

In another non-limiting example, in an "optical method" (referring to the first embodiment), a predetermined number of points may be defined on the lens within a disk having a radius of 30°, with a 2° step. Similarly, in a "surfacic method (referring to the second embodiment), a predetermined number of points may be defined on the surface within a disk having a radius of 15 mm, with a 1 mm step.

In the first embodiment shown in FIG. 2 described above, by way of non-limiting example, the value j may be set to 2 and the optical characteristics may be the wearer power and unwanted astigmatism (also referred to herein as astigmatism aberration), as described previously with reference to FIG. 3. For instance, in such a case, Lit is the value of the wearer power measured at the point i and $L_{i2}$ is the value of astigmatism aberration measured at the point i.

In the second embodiment shown in FIG. 6 described above, by way of non-limiting example, the value j may be set to 1 and the geometrical characteristics may be the mean curvature, as described previously with reference to FIG. 7. For instance, in such a case, Lit is the value of the mean power measured at the point i.

In the second embodiment of FIG. 6, in another non-limiting example, the value j may be set to 3 and the geometrical characteristics may be the value of the minimum and maximum curvatures and the axis orientation, all measured at the point i. In such a case, Lit is the value of the minimum curvature measured at the point i, $L_{i2}$ is the value of the maximum curvature measured at the point i and Lis is the axis orientation measured at the point i.

The weighting parameter $p_i$ makes it possible to apply a higher or lower weighting to various regions of the lens.

For example, if, in an optical path, a predetermined number of points is defined within a disk having a radius of 30°, with a 2° step, or if, in a surfacic path, a predetermined number of points may be defined within a disk having a radius of 15 mm, with a 1 mm step, a higher weighting is advantageously applied on the predetermined optical or surfacic path and decreasing weightings are applied when moving away from that path.

By way of non-limiting example, the above-mentioned given quantity to be reached by the value of the merit function may be expressed in diopters and may take the value of 0.12, preferably 0.06, more preferably 0.03.

Both above-mentioned embodiments may be combined, i.e. both ending criterions of a predetermined number of iterations and a value of a merit function lower than a given quantity, may be used together.

Optionally, in addition to the ending criterion, step (c) may further comprise a step of checking that the current lens satisfies a predetermined performance criterion. The ending criterion would be a root mean square deviation with respect to a predetermined target, whereas the performance criterion could be a RMS deviation with respect to Rx.

In case a step of checking that the current lens satisfies a predetermined performance criterion is carried out, the predetermined performance criterion may relate to a root mean square deviation of at least one of the optical characteristics of the lens along the above-mentioned predetermined path in comparison to the corresponding one of the targeted optical characteristics defined at step (b).

By way of non-limiting example, the root mean square deviation may be lower than 0.12 diopter, preferably lower than 0.06 diopter, more preferably lower than 0.03 diopter.

Step (c3) is followed by step (d), at which the finished single vision ophthalmic lens is provided, as the current lens obtained after the ending criterion has been met.

Figure 10:
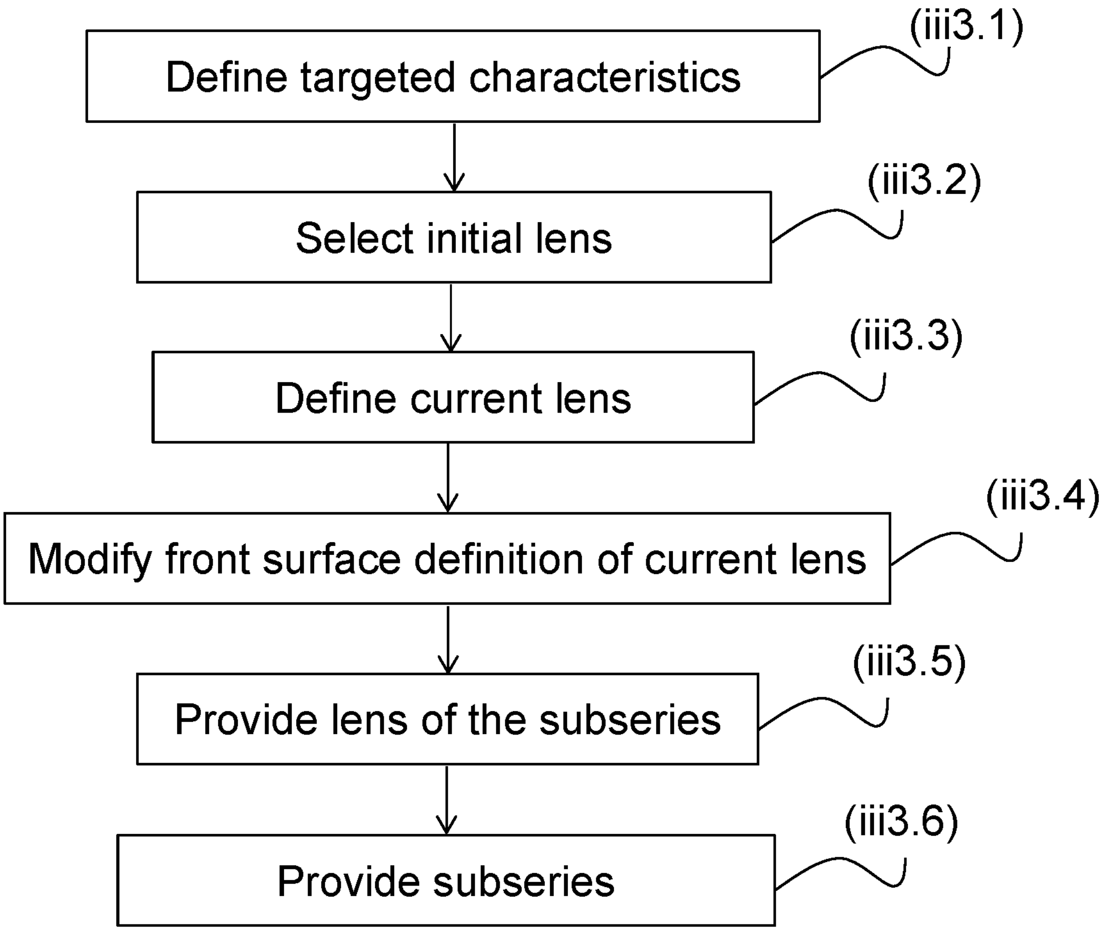
FIG. 10 is a flow diagram showing more details of the step of providing the subseries of finished ophthalmic lenses, in the embodiment of FIGS. 8 and 9.

The flow diagrams of FIGS. 8, 9 and 10 show steps of a method according to the present disclosure for determining a series of finished ophthalmic lenses having a rotationally symmetrical front surface.

FIG. 8 shows steps (i), (ii), (iii) and (iv) of the method. FIG. 9 shows steps (iii1) to (iii4) detailing step (iii), as well as step (iii5) that is a possible iteration process, returning to step (ii) of FIG. 8. FIG. 10 shows details of step (iii3) of FIG. 9. Step (iii3) includes steps of the above-detailed method for providing a finished single vision ophthalmic lens.

The method according to the present disclosure for determining a series of finished ophthalmic lenses is intended to cover a wide range of values of possible prescriptions.

As shown in FIG. 8, at a first step (i) of that method, a given range of values of prescription data is set for the finished ophthalmic lenses of the series of lenses to be provided. Such values are hereafter denoted Rx.

The prescription data may include the sphere value and the cylinder value, expressed in diopters.

By way of non-limiting example, the prescription data may be a sphere value in the range [−6, +3] including the boundaries of the interval, and a cylinder value in the range [0, −2], also including the boundaries of the interval, where sphere and cylinder actually represent power and astigmatism.

At a following step (ii), that range is split into a predetermined number of Rx subdomains, hereafter denoted Rxn, n=1, . . . , N, where n is an integer.

By way of non-limiting example, with the above exemplary sphere and cylinder value ranges, if N=7, seven subdomains Rx1, Rx2, . . . , Rx7 are defined at step (ii).

Then, at step (iii), a subseries of the series of finished ophthalmic lenses is provided for each subdomain Rxn, n=1, . . . , N.

Last step (iv) then consists of determining the series of finished ophthalmic lenses by gathering the subseries of ophthalmic lenses previously provided for each subdomain Rxn upon carrying out step (iii).

Step (iii) is now described in more details with reference to FIGS. 9 and 10.

As shown in FIG. 9, at step (iii1), a so-called base value is defined.

In an embodiment, the base value may be a sphere value, expressed in diopters, representative of a surface curvature, at the optical center of a front surface hereafter denoted FS0, of a finished ophthalmic lens of the subseries of lenses corresponding to the considered subdomain Rxn. The base value is calculated based on a fixed refractive index, e.g. of 1.53, for the lens material.

For a given front surface curvature and a given refractive index, in a first approximation, the lens power will depend on the curvature of the back surface.

In the above non-limiting example of prescription data sphere [−6, +3] and cylinder [0, −2], the base values may be set as the following list: (4.69, 4.28, 3.87, 3.42, 286, 2.25, 1.54). It is expressed according to the lens refractive index.

In any case, FS0 covers a given subdomain Rxn, e.g. Rx1 in the above non-limiting example with seven subdomains.

As described above, the base value is defined according to optical and/or geometrical requirements. Those requirements are not the same as the targeted optical or geometrical characteristics referred to at step (b) of the above-detailed method for providing a finished single vision ophthalmic lens.

At a following step (iii2), prescription data available in the considered subdomain Rxn and representative of the entire subdomain Rxn, e.g. the average value of the prescription data of the subdomain Rxn, are selected. Such selected prescription data are hereafter denoted Rxnp, where p is an integer comprised between 1 and P.

In the above non-limiting example, the subdomain Rx1 may thus comprise prescription data Rx11, . . . , Rx1p, . . . Rx1P and the value selected at step (iii2) may be the average of the values of Rx11, . . . , Rx1p, . . . Rx1P.

Next, at step (iii3), the subseries of lenses is provided by carrying out steps (iii3.1) to (iii3.6) shown in FIG. 10 and detailed below.

Last, at step (iii4), it is checked whether the front surface FS0 has good performances for all the prescription data of the considered subdomain Rxn, i.e. it is checked that the subseries satisfies a predetermined performance criterion for all the prescription data Rxnp, p=1, . . . , P of the considered subdomain Rxn.

Step (iii4) is optional. In other words, the proposed method does not necessarily use a performance criterion.

In the embodiment of FIG. 9, where a performance criterion is used i.e. step (iii4) is carried out, the performance criterion may relate to an evaluation of aberrations of the lens.

It may be based on a comparison between the performances of the obtained lens and the prescription, such performances being calculated along a predetermined path in the lens, without taking into account the targeted optical or geometrical characteristics.

The performances referred to may be optical performances, such as power and astigmatism, of the whole lens with its front and back surfaces. Less power errors and/or less unwanted astigmatism mean better performances.

In a particular embodiment, the performance criterion may relate to a root mean square deviation of at least one of those optical characteristics along the above-mentioned predetermined path. By way of non-limiting example, the root mean square deviation is evaluated with respect to Rx.

In the embodiment of FIG. 9, if, at step (iii4), the performance criterion is satisfied for all the prescription data Rxnp, p=1, . . . , P, i.e. for the entire considered subdomain Rxn, step (iii) is ended for the considered subdomain Rxn.

Step (iii) is then performed for another one of the subdomains, until step (iii) has been performed for all subdomains.

On the other hand, if, at step (iii4), for any one of the prescription data Rnp, p=1, . . . , P, FS0 does not satisfy the performance criterion, a step (iii5) is carried out, which consists of modifying the subdomain by returning to the splitting step (ii) to re-split Rx into new ranges Rxn', where n' is an integer comprised between 1 and N' and N' may differ from N.

Step (iii3) of providing the subseries of lenses for the considered subdomain Rxn of values of prescription data comprises steps (iii3.1) to (iii3.6) that are now detailed with reference to FIG. 10.

As shown in FIG. 10, at step (iii3.1), targeted optical or geometrical characteristics are defined along a predetermined path on a target lens, based on the prescription data Rxnp representative of the considered subdomain Rxn. The target lens has at least one complex surface.

Then, at step (iii3.2), an initial lens is selected, having a rotationally symmetrical front surface and a predetermined surface curvature at a prescription reference point and complying with the prescription value representative of Rxnp prescriptions in the subdomain Rxn. The initial lens is selected based on step (iii2).

By way of non-limiting example, the optical center of the lens may be chosen as the prescription reference point.

Next, at step (iii3.3), a lens optimizing process begins by defining a current lens. At the beginning of the optimizing process, the current lens is the initial lens selected at step (iii3.2).

Then, at step (iii3.4), the optimizing process consists of minimizing, by iterations, differences between the optical or geometrical characteristics of the current lens and the optical or geometrical characteristics of the target lens, i.e. the targeted optical or geometrical characteristics defined at step (iii3.1).

Such minimizing is obtained by modifying at each iteration the definition of the front surface of the current lens to reach the targeted optical or geometrical characteristics.

By way of non-limiting example, the front surface of the current lens might remain rotationally symmetrical when the definition of the front surface is being modified.

Step (iii3.4) ends when an ending criterion is met.

In an embodiment, the ending criterion may be a predetermined number of iterations.

By way of non-limiting example, the number of iterations may be set to 10 or 20.

In another embodiment, the ending criterion may be defined as a value of a difference between the optical or geometrical characteristics of the lens and the targeted optical or geometrical characteristics, i.e. deviations of the optical or geometrical characteristics of the current lens compared to the target lens.

By way of non-limiting example, the ending criterion may be defined as the value of a merit function representing those deviations and the optimizing process consists in minimizing that value, so that step (iii3.4) ends when the value of the merit function is lower than a given quantity.

Thus, for a set of points on the lens or of the eyesight directions, identified by a variable i, the merit function may take the following form:

$$\sum p_i \cdot \sum w_{ij} \cdot (L_{ij} - T_{ij})^2$$

where:

$p_i$ is a weighting of the point i, $L_{ij}$ is the value of the j-th type of optical or geometrical characteristic at the point i, $T_{ij}$ is the target value of the j-th type of optical or geometrical characteristic at the point i, $w_{ij}$ is the weighting of the j-th type of optical or geometrical characteristic at the point i.

By way of non-limiting example, the above-mentioned given quantity to be reached by the value of the merit function may be expressed in diopters and may take the value of 0.12, preferably 0.06, more preferably 0.03.

Both above-mentioned embodiments may be combined, i.e. both ending criterions of a predetermined number of iterations and a value of a merit function lower than a given quantity, may be used together.

Step (iii3.4) is followed by step (iii3.5), at which one of the finished ophthalmic lenses of the subseries of lenses is provided, as the current lens obtained after the ending criterion has been met.

Last, at step (iii3.6), the subseries of finished ophthalmic lenses is provided as follows: all the lenses of the subseries have the same front surface, consisting of the optimized modified front surface provided at step (iii3.5) that meets the ending criterion and each of the lenses of the subseries has a sphero-toric back surface differing from that of the other lenses of the subseries and respectively corresponds to one of the prescription data of the considered subdomain Rxn.

The finished single vision ophthalmic lens according to the present disclosure is the current lens meeting the above-described ending criterion which is obtained by the above-described method for providing a finished single vision ophthalmic lens, according to any of the described embodiments.

The computer program product according to the present disclosure comprises instructions that, when executed by a processor, cause the processor to carry out steps of the above-described method for providing a finished single vision ophthalmic lens, according to any of the described embodiments.

Although representative methods and devices have been described in detail herein, those skilled in the art will recognize that various substitutions and modifications may be made without departing from the scope of what is described and defined by the appended claims.

The invention claimed is:

1. A computer-implemented method for providing a finished single vision ophthalmic lens intended for a wearer, from a target lens different from said finished single vision ophthalmic lens and having at least one complex surface, wherein the complex surface is a surface having no central or axial symmetry, the target lens being a target ophthalmic lens on the basis of which the finished single vision ophthalmic lens will be provided, said finished lens having a rotationally symmetrical front surface, wherein said method comprises:

(a) providing, either wearer data including prescription data relating to an eye of said wearer, or theoretical data from a computer simulation including prescription data relating to a virtual eye;

(b) defining targeted optical or geometrical characteristics of said target lens along a predetermined path on said target lens, based on said wearer data or on said theoretical data;

(c) determining said finished single vision ophthalmic lens by:

(c1) selecting an initial lens, different from said target lens, complying with said prescription data and having a rotationally symmetrical front surface and a predetermined curvature at a prescription reference point;

(c2) defining a current lens as said initial lens;

(c3) modifying a front surface definition of said current lens to reach said targeted optical or geometrical characteristics of said target lens until an ending criterion is met;

(d) providing said finished single vision ophthalmic lens as said current lens.

2. The method according to claim 1, wherein said predetermined path is an optical path and extends vertically from −60° to 60°.

3. The method according to claim 1, wherein said determining said finished single vision ophthalmic lens further comprises checking that said current lens satisfies a predetermined performance criterion.

4. The method according to claim 3, wherein said predetermined performance criterion relates to a root mean square deviation of at least one of said optical characteristics along said predetermined path.

5. The method according to claim 4, wherein said root mean square deviation is lower than 0.12 diopter.

6. The method according to claim 1, wherein said modifying said front surface definition of said current lens comprises modifying the curvature of said current lens along the rotational symmetry axis of the front surface of said current lens.

7. The method according to claim 1, wherein said targeted optical characteristics comprise a predetermined distribution of a mean power and astigmatism in said target lens.

8. The method according to claim 1, wherein said targeted geometrical characteristics comprise either a predetermined distribution of a mean curvature of a front surface of said target lens, or a minimum curvature and an axis orientation of said front surface of said target lens, or a maximum curvature and an axis orientation of said front surface of said target lens, or at the same time a predetermined distribution of a mean curvature of said front surface of said target lens, a minimum and maximum curvature and an axis orientation of said front surface of said target lens.

9. The method according to claim 1, wherein said modifying said front surface definition of said current lens comprises:

defining a representative optical path in said front surface of said current lens, said representative optical path being representative of an eye sight orientation when said wearer is looking upward or downward to switch between far vision and near vision;

evaluating optical characteristics of said current lens along said representative optical path;

determining the front surface of said current lens that, in combination with a sphero-toric back surface of said current lens, provides values of optical characteristics along an optical path that are the closest to values of said targeted optical characteristics along said representative optical path;

defining a modified front surface of said current lens as said determined front surface.

10. The method according to claim 9, wherein said representative optical path comprises a predetermined number of path segments covering areas for far vision use and/or for near vision use.

11. The method according to claim 9, wherein said representative optical path comprises two path segments covering an area for far vision use that extends from −10° to 0° and an area for near vision use that extends from 16° to 28°.

12. The method according to claim 1, wherein said modifying said front surface definition of said current lens comprises:

defining a representative surfacic path on said front surface of said current lens, said representative surfacic path being representative of an eye sight orientation when said wearer is looking upward or downward to switch between far vision and near vision;

evaluating a curvature of said front surface of said current lens along said representative surfacic path;

determining the front surface of said current lens that provides values of geometrical characteristics of said target lens along a surfacic path that are the closest to values of said targeted geometrical characteristics along said representative surfacic path;

defining a modified front surface of said current lens as said determined front surface.

13. A computer-implemented method for determining a series of finished ophthalmic lenses having a rotationally symmetrical front surface, wherein said method comprises:

(i) setting a range of values of prescription data of said finished ophthalmic lenses of said series;

(ii) splitting said range into a predetermined number of subdomains of values of prescription data;

(iii) for each of said subdomains, providing a subseries of finished ophthalmic lenses of said series, by:

(iii1) defining a base value representative of a surface curvature at the optical center of a front surface of a finished ophthalmic lens of said subseries, according to optical and/or geometrical requirements;

(iii2) selecting prescription data representative of said subdomain;

(iii3) providing said subseries by:

(iii3.1) defining targeted optical or geometrical characteristics of a target lens along a predetermined path on saida target lens, based on said prescription data representative of said subdomain, said target lens having at least one complex surface, wherein the complex surface is a surface having no central or axial symmetry;

(iii3.2) selecting an initial lens different from said target lens complying with said prescription data representative of said subdomain and having a rotationally symmetrical front surface and a predetermined surface curvature at a prescription reference point;

(iii3.3) defining a current lens as said initial lens;

(iii3.4) modifying a front surface definition of said current lens to reach said targeted optical or geometrical characteristics of said target lens until an ending criterion is met;

(iii3.5) providing a finished ophthalmic lens of said subseries as said current lens;

(iii3.6) providing said subseries of finished ophthalmic lenses as all having a same front surface consisting of said modified front surface meeting said ending criterion and different sphero-toric back surfaces respectively corresponding to all the prescription data of said subdomain;

(iii4) checking that said subseries satisfies a predetermined performance criterion for all the prescription data of said subdomain;

(iii5) returning to splitting step (ii) and modifying said subdomains if said predetermined performance criterion is not met for all the prescription data of said subdomain;

(iv) determining said series as said subseries provided for all of said subdomains.

14. A finished single vision ophthalmic lens intended for a wearer, wherein said lens has a rotationally symmetrical front surface and a back surface from a target lens different from said finished single vision ophthalmic lens and having at least one complex surface, wherein the complex surface is a surface having no central or axial symmetry, the target lens being a target ophthalmic lens on the basis of which the finished single vision ophthalmic lens will be provided, said finished single vision ophthalmic lens being provided by:

(a) providing, either wearer data including prescription data relating to an eye of said wearer, or theoretical data from a computer simulation including prescription data relating to a virtual eye;

(b) defining targeted optical or geometrical characteristics of said target lens along a predetermined path on said target lens, based on said wearer data or on said theoretical data;

(c) determining said finished single vision ophthalmic lens by:

(c1) selecting an initial lens different from said target lens complying with said prescription data and having a rotationally symmetrical front surface and a predetermined curvature at a prescription reference point;

(c2) defining a current lens as said initial lens;

(c3) modifying a front surface definition of said current lens to reach said targeted optical or geometrical characteristics until an ending criterion is met;

said finished single vision ophthalmic lens being the current lens that meets said ending criterion.

15. A non-transitory computer-readable medium on which is stored computer program comprising instructions that, when executed by a processor, cause said processor to provide a finished single vision ophthalmic lens intended for a wearer, from a target lens different from said finished single vision ophthalmic lens and having at least one complex surface, wherein the complex surface is a surface having no central or axial symmetry, the target lens being a target ophthalmic lens on the basis of which the finished single vision ophthalmic lens will be provided, said finished lens having a rotationally symmetrical front surface, by:

(a) providing, either wearer data including prescription data relating to an eye of said wearer, or theoretical data from a computer simulation including prescription data relating to a virtual eye;

(b) defining targeted optical or geometrical characteristics of said target lens along a predetermined path on said target lens, based on said wearer data or on said theoretical data;

(c) determining said finished single vision ophthalmic lens by:

(c1) selecting an initial lens different from said target lens complying with said prescription data and having a rotationally symmetrical front surface and a predetermined curvature at a prescription reference point;

(c2) defining a current lens as said initial lens;

(c3) modifying a front surface definition of said current lens to reach said targeted optical or geometrical characteristics of said target lens until an ending criterion is met;

(d) providing said finished single vision ophthalmic lens as said current lens.

16. The method according to claim 1, wherein said predetermined path is an optical path and extends vertically from −45° to 45°.

17. The method according to claim 1, wherein said predetermined path is an optical path and extends vertically from −30° to 30°.

18. The method according to claim 4, wherein said root mean square deviation is lower than 0.06 diopter.

19. The method according to claim 4, wherein said root mean square deviation is lower than 0.03 diopter.

20. The method according to claim 2, wherein said determining said finished single vision ophthalmic lens further comprises checking that said current lens satisfies a predetermined performance criterion.

* * * * *